United States Patent [19]

Ogden

[11] Patent Number: 5,572,749

[45] Date of Patent: Nov. 12, 1996

[54] HELMET MOUNTING DEVICE AND SYSTEM

[75] Inventor: Andrew M. Ogden, Pasadena, Calif.

[73] Assignee: The Walt Disney Company, Burbank, Calif.

[21] Appl. No.: 267,183

[22] Filed: Jun. 28, 1994

[51] Int. Cl.[6] ....................................................... A42B 3/00
[52] U.S. Cl. ........................ 2/421; 2/422; 2/413; 2/410; 472/59; 472/61
[58] Field of Search .................................. 2/410, 6.1, 6.2, 2/416, 417, 418, 419, 420, 421, 422, 10, 209.13, 906; 273/433, 434, DIG. 17; 472/57, 59, 60, 61; 353/DIG. 6; 359/880, 630, 13

[56] References Cited

U.S. PATENT DOCUMENTS

| | | | |
|---|---|---|---|
| 3,016,541 | 1/1962 | Archbold | 2/419 |
| 3,897,596 | 8/1975 | Aileo et al. | 2/420 |
| 4,055,860 | 11/1977 | King | 2/416 |
| 4,703,879 | 11/1987 | Kastendick et al. | 2/422 |
| 4,833,735 | 5/1989 | Long et al. | 2/419 |
| 5,042,177 | 8/1991 | Schoch | 36/117 |
| 5,079,780 | 1/1992 | Coombs et al. | 2/420 |
| 5,150,479 | 9/1992 | Oleson | 2/414 |

FOREIGN PATENT DOCUMENTS

| | | | |
|---|---|---|---|
| 622030 | 11/1994 | European Pat. Off. | 2/422 |
| 998695 | 7/1965 | United Kingdom | 2/420 |

*Primary Examiner*—Michael A. Neas
*Attorney, Agent, or Firm*—Fish & Neave; Jeffrey H. Ingerman

[57] ABSTRACT

A helmet mounting device which allows a helmet to be securely mounted to a user's head in a desired alignment, without irritating chin straps, is provided. The device includes a frame and a liner with a retention band that can be uniformly tightened about the user's head and that aligns with cranial features such as the indentation in the occipital area at the base of the skull. A plurality of these devices can be given out in advance to users waiting on line for a virtual reality amusement attraction, who can don them in advance. When a user reaches the attraction, he or she can easily slip onto the device a helmet having shape complementary to the device for quick alignment. When the user is finished, the device can easily be cleaned before being given to the next user.

29 Claims, 8 Drawing Sheets

HELMET MOUNTING DEVICE AND SYSTEM

BACKGROUND OF THE INVENTION

This invention relates to a device and system for mounting a helmet on the head of a user. More particularly, the invention relates to a device for mounting a helmet including a head-mounted display on the head of a user, and to a system for mounting such a helmet on the heads of a succession of users.

"Virtual reality" is a phrase that has been used to describe the experience of living or playing in a computer simulated environment which models a three dimensional ("3-D") virtual space (i.e., a virtual world). In virtual reality systems, a viewer typically dons a set of helmet-mounted video screens or some other form of head-mounted device on which the viewer sees images of virtual world scenes. In addition, the user may be able to interact with objects in the virtual world by maneuvering a pointing device. In more sophisticated systems, the user might wear special gloves or even a full body suit containing sensors and actuators that allow the user to feel, as well as influence, objects in the virtual world.

Virtual reality systems incorporating visual images and user input have been extensively used in military and commercial applications, such as flight simulators. Virtual reality systems may also be used in entertainment applications including computer games, video arcade games and theme park attractions.

When mounting a head-mounted display on the head of a user, care must be taken to properly align the optics of the display with the user's eyes so that the user is visually immersed to the maximum possible extent in the virtual world, without any visual artifacts that might be introduced by misalignment. This is particularly important in an amusement-type virtual reality attraction; for military and commercial applications a less than perfect simulation might be acceptable, but in an amusement-type application, total immersion of the user in the virtual world is important for maximum enjoyment by the user.

At the same time, it is important to be able to mount the head-mounted display quickly but securely on the head of an amusement attraction user with proper alignment. A user who has been waiting in line for a turn to experience a virtual reality amusement attraction could quickly lose patience if it takes a long time to be properly fitted with a massive and bulky virtual reality helmet.

In addition, it is preferable to avoid the use of fastening devices such as chin straps, which could chafe the user and otherwise prove uncomfortable as the user is moved around by the virtual reality simulator.

Moreover, in view of the relatively high cost of the equipment needed to present a virtual reality experience, there are unlikely to be more than a small number of virtual reality simulators at any one attraction. Thus the flow of users cannot be kept upon the basis of a large number of stations. For this reason also, it must be possible to quickly fit each user with his or her helmet.

In addition, the head-mounted display helmets will be worn by large numbers of people. Particularly in the context of an amusement attraction, both health regulations and user preferences may require that the helmets be cleaned after each use. This may be difficult with a helmet that includes the electronics of a head-mounted display. In addition, the large number of users will necessarily have heads of many different sizes, yet it may be inconvenient or expensive to have on hand the correct mix of helmets of different sizes, and it may further be time consuming to select the correct size for each user.

Finally, because the helmets will be used by large numbers of people, they will be handled frequently. However, frequent handling may result in damage to the helmets.

For these reasons, it would be desirable to be able to provide a way to mount a helmet, particularly one with a head-mounted display, quickly and securely on the head of a user.

It would also be desirable to be able to provide a head-mounted display helmet whose optical path can be quickly and easily aligned with the eyes of user.

It would further be desirable to be able to provide a system in which each user could be assured of a clean helmet of the correct size, and in which the helmets would be resistant to breakage from excessive handling such as might occur in a theme park setting.

SUMMARY OF THE INVENTION

It is an object of this invention to provide a way to mount a helmet, particularly one with a head-mounted display, quickly and securely on the head of a user.

It is also an object of this invention to provide a head-mounted display helmet whose optical path can be quickly and easily aligned with the eyes of user.

It is a further object of this invention to provide a system in which each user could be assured of a clean helmet of the correct size, and in which the helmets would be resistant to breakage from excessive handling such as might occur in a theme park setting.

In accordance with the present invention, there is provided a helmet mounting device for mounting a helmet on a head of a user. The helmet mounting device includes a frame for resting on the user's head for accepting the helmet. A retention band depends from the frame. A tightening mechanism tightens the retention band after the frame has been placed on the user's head. The frame is preferably spherically asymmetrical for aligning with a corresponding spherically asymmetrical cavity in the head-mounted display. In a system according to the invention, the number of frames exceeds the number of helmets, so that each user can be fitted with a frame while waiting for a preceding user to finish the virtual reality experience, and to allow cleaning of the frames while other frames are being used.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention is a helmet mounting device for simple, quick and accurately aimed mounting of a helmet on the head of a user, particularly for the purpose of mounting head mounted display for a virtual reality experience. A helmet incorporating the device, and a virtual reality helmet including a head-mounted display, are also contemplated by the present invention, as is a system for using the device in a theme park attraction or similar setting.

The helmet mounting device includes a frame having a particular shape that is spherically asymmetric, and a liner inside the frame having a retention band with a tightening mechanism for tightening the retention band uniformly about the user's head to secure the device to the user's head. The retention band and tightening mechanism together align themselves to features of the user's skull. In particular, the retention band aligns to the brow ridge and the ears, while the tightening mechanism aligns to the indentation in the occipital region at the base of the skull. The occipital indentation also serves as a "hook" which the tightening mechanism can engage to assist the uniformly tightened retention band to maintain the device securely on the user's head without the use of, e.g., chin straps.

The frame of the helmet mounting device is intended to receive a helmet having a complementary asymmetrical shape to that of the frame. The asymmetry of the shape assures that the helmet and frame fit together in only one orientation, so that the helmet is automatically oriented in the desired orientation. In the case of a helmet carrying a head-mounted display for a virtual reality experience, the orientation is chosen so that the user is looking substantially directly at the appropriate point ("the sweet spot") of the optics of the head-mounted display, and the speakers of the head-mounted display are opposite the user's ears. Of course, the helmet may be used to mount other devices, such as medical monitors or similar equipment.

Preferably, the helmet is built around a shell specifically designed to complement the frame, although the helmet could instead be built with a cavity that mates to the frame without a separate shell. In any event, the working electronics of the helmet is separated from the frame, which allows the frame to be thoroughly cleaned after each user without damaging the electronics.

In a virtual reality helmet system according to the invention, useful, e.g., for an amusement-type virtual reality attraction, there are many more frames than there are head-mounted display helmets. As users waiting in line to experience the virtual reality attraction, approach the front of the line, attendants of the attraction will pass out frames to each user. While the users are still waiting, each user will be able to secure the frame to his or her head. All of the frames would be the same size—this is necessary for mating the frames to the shells or helmets—but the retention band can be tightened to adjust to any user's head size and shape.

When an individual user's turn to experience the virtual reality attraction arrives, it will be necessary for that user only to slip the head-mounted display helmet over the frame. After the virtual reality experience, the user will remove the helmet from the frame, then remove the frame from his or her head and return it to the attendants for cleaning and re-use. This system allows for the time-consuming donning and doffing of the frames to occur before and after the experience without contributing to "down-time" of the virtual reality attraction.

In order to minimize the time needed to mate the helmet to the frame, the frame preferably has guide ridges that mate to corresponding guide grooves in the helmet. The ridges and grooves are continuously convex outward or concave inward, respectively, and are otherwise shaped to be self-guiding; at least as long as the helmet is initially placed on the frame within 90° of the correct orientation, it will assume the correct orientation substantially by itself without jamming.

In order for the frames, and shells if any, to be as light as possible for user comfort, and to provide a clean appearance, they are preferably fenestrated—i.e., they are not solid but have openings. In a particularly preferred embodiment described below, the frame is essentially four struts extending upward from a lower ring substantially to a central point.

Because the frames of the present invention, when used in a system according to the invention as just described, will be subject to handling by many users, each of whom will have possession of a frame for a significant amount of time, the frames, and preferably the shells as well, are preferably made from a carbon fiber composite material for strength. In addition, the struts of the preferred embodiment of the frame (and shell, if provided) are made with a particularly stiff cross section, as described below. The stiff cross section also prevents bending of the frame, thereby preventing misalignment of the helmet with the user's eyes.

Figure 1:
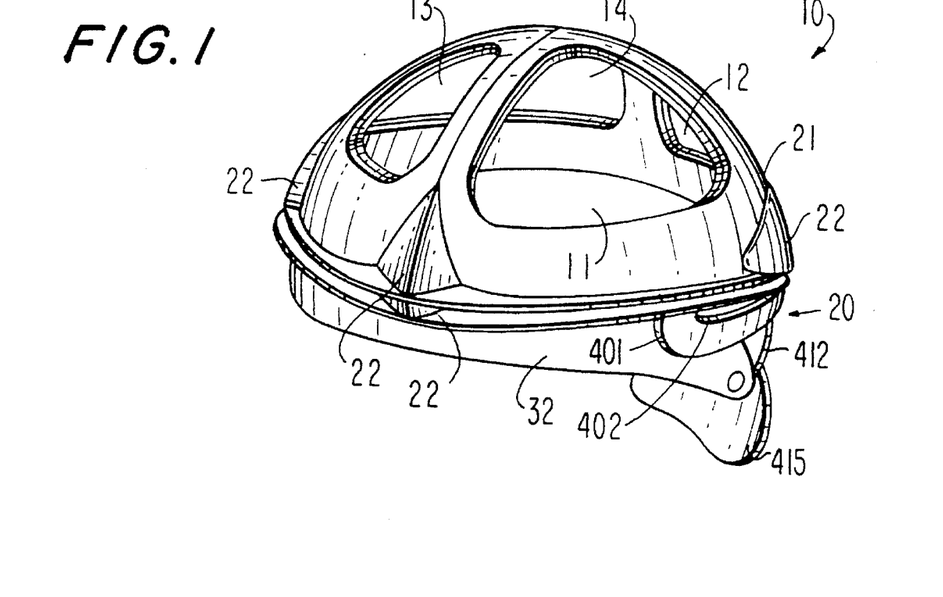
FIG. 1 is a perspective view of a preferred embodiment of a helmet mounting device according to the present invention.
Figure 2:
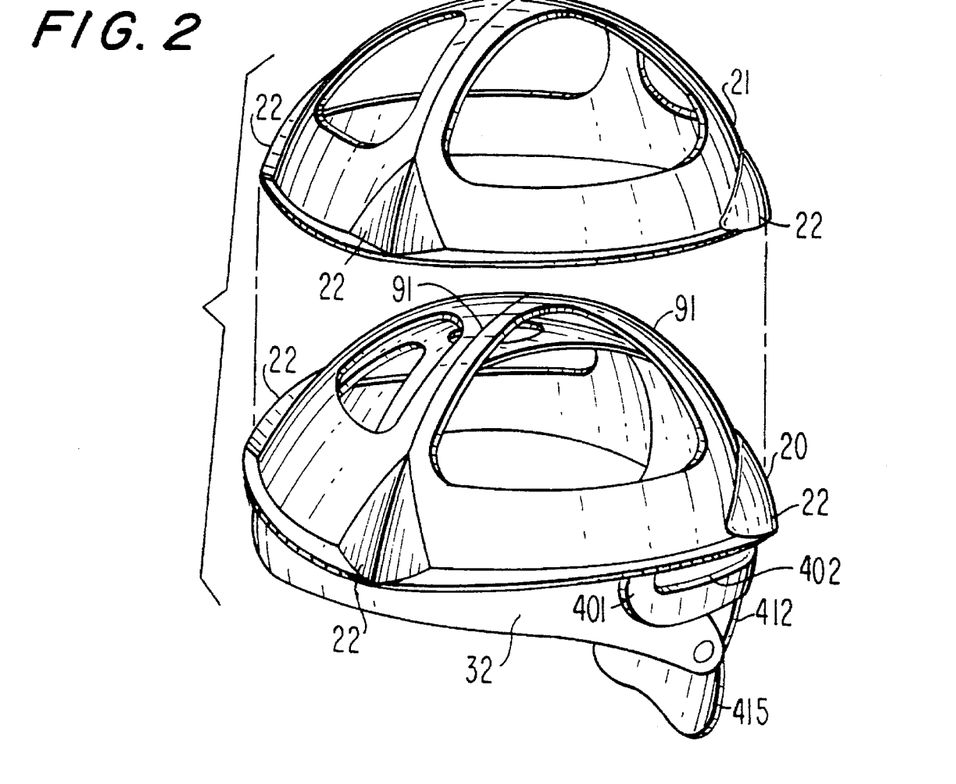
FIG. 2 is an exploded perspective view of the helmet mounting device of FIG. 1 showing the frame and the shell.

Particularly preferred embodiments of a helmet mounting device and a virtual reality helmet according to the present invention may be described in connection with FIGS. 1–10. FIG. 1 shows a complete helmet base 10—i.e., a helmet mounting device 20 and a helmet shell 21 nested together and ready to receive the working portions of a helmet. A complete helmet 100 for use as a head-mounted display in a virtual reality system is shown schematically in FIG. 10, in which helmet body 101, housing optics (not shown) in optics extension 102, as well as stereo speakers 103 (one shown) adjacent the user's ears, is mounted on shell 21.

Figure 3:
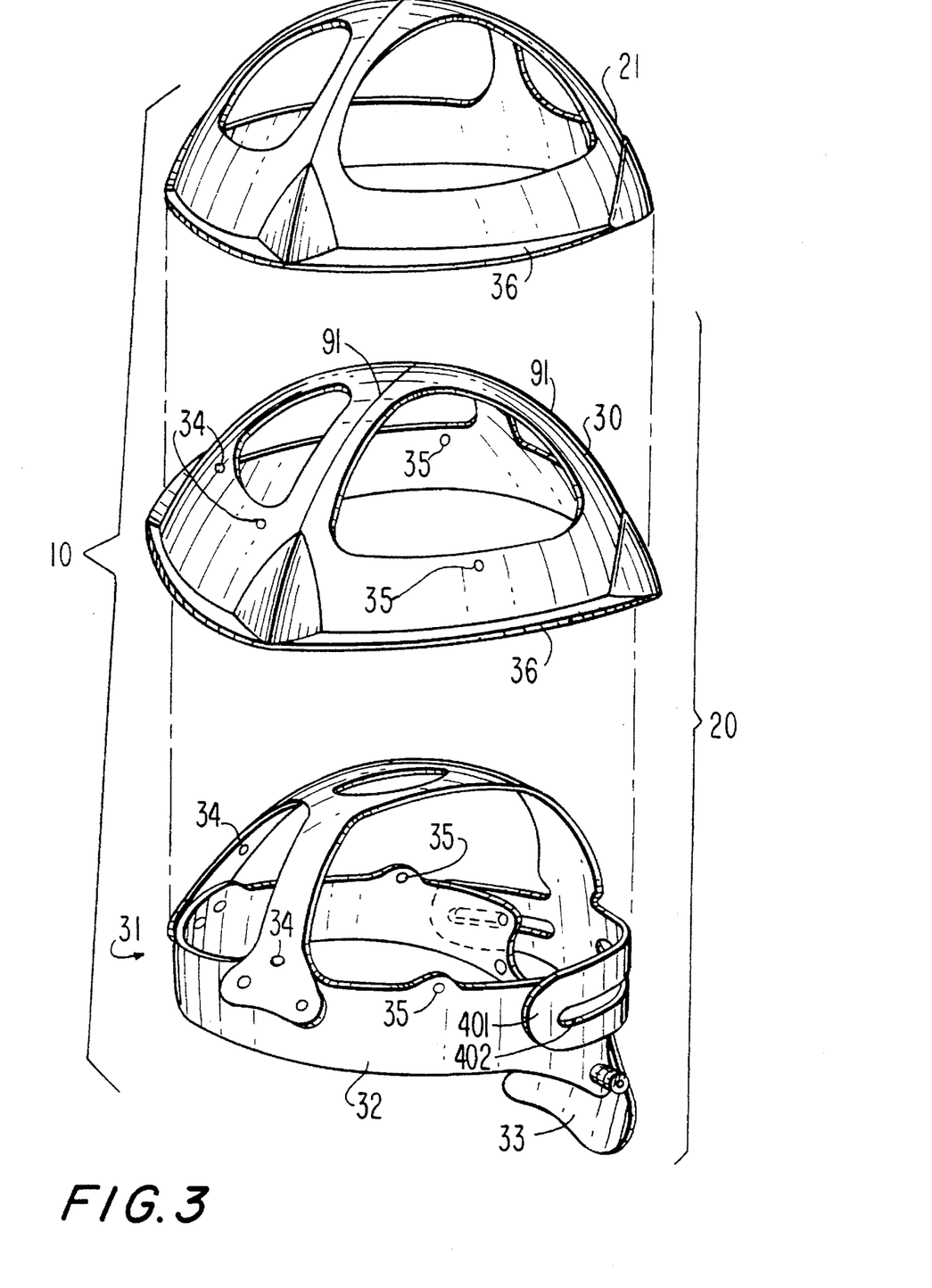
FIG. 3 is a exploded perspective view of the frame of FIG. 2, showing the liner.

As best seen in FIG. 3, helmet mounting device 20 itself includes frame 30 and liner 31. Liner 31 includes retention band 32 and tightening mechanism 33 which tightens retention band 32 about the head 50 of a user. Liner 31 is attached to frame 30 by rivets or similar fasteners 40 at forward attachment points 34 and rearward attachment points 35. Rearward attachment points 35 are closer to the middle of helmet mounting device 20 than to the rear, leaving all of retention band 32 behind attachment points 35 free to move forward, as discussed in more detail below. Both frame 30 and shell 21 have flanges 36 that serve as stops to help align the two parts when they are nested, preventing shell 21 from resting askew on frame 30 with a portion of its bottom edge descending below the bottom edge of frame 30.

Figure 4:
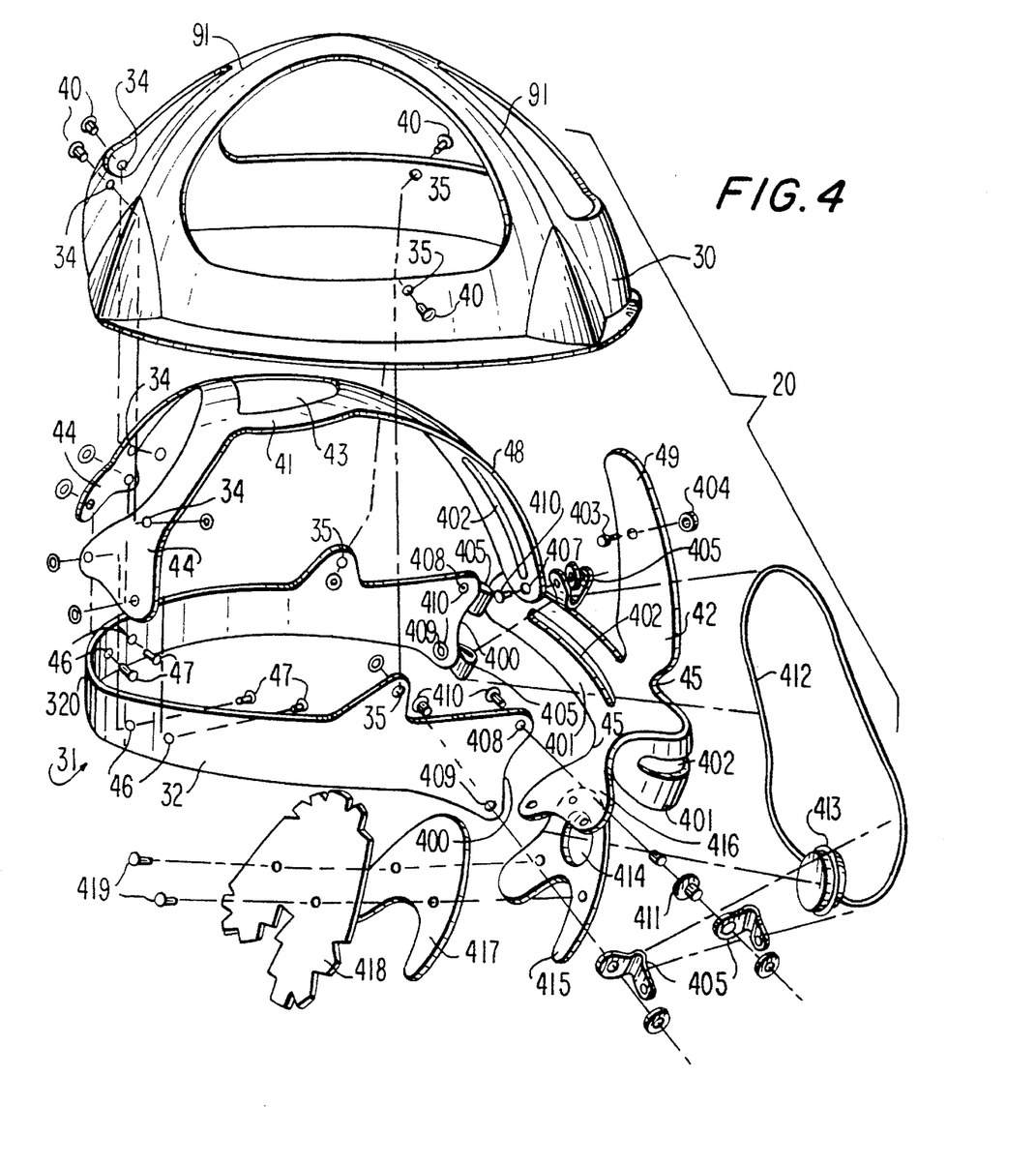
FIG. 4 is a more fully exploded perspective view of the frame of FIGS. 2 and 3.

Liner 31 is the portion of helmet mounting device 20 that must actually conform to user's head 50. As such it must be capable of assuming a roughly spherical shape. In the preferred embodiment, as shown in FIG. 4, liner 31 is made from several pieces—primarily retention band 32, upper yoke 41 and rear yoke 42. Band 32 and yokes 40 and 41 are preferably cut from a flat flexible material, which most preferably is a low density polyethylene (LDPE), in such a way that each naturally tends to fold or curl in to a spherical shape. For example, the narrow area 320 at the front of band 32 creates a point at which band 32 naturally tends to bend. Similarly, the location of opening 43 and the shape and positions of arms 44 combine to cause upper yoke 41 to tend to assume a spherical shape. The same can be said of narrow areas 45 of yoke 42.

Arms 44 of upper yoke 41 preferably are rigidly attached to retention band 32 at points 46 by rivets or similar fasteners 47, or upper yoke 41 and retention band 32 could be molded as a single piece. However, rear arm 48 of yoke 41 is preferably slidingly connected, as discussed below, to upper arm 49 of rear yoke 42. Similarly, rear ends 400 of retention band 32 preferably are slidingly connected to side arms 401 of rear yoke 42. The slidable connections preferably are achieved by having a respective slot 402 in each of arms 48, 401. Arm 48 is placed behind arm 49 (see assembled condition in FIG. 6) and a rivet 403 is fastened through arm 49 and slot 402 of arm 48 to a spacer 404 that allows rivet 403 to slide in slot 402. Arms 401 are similarly fastened to ends 400 of retention band 32.

Cable guides 405 preferably are attached, as by rivets 410, to point 407 on arm 48, and to upper points 408 and lower points 409 on retention band 32, by rivets 410. Preferably, each rivet 410 associated with one of upper points 408 passes through respective slot 402 of respective arm 401 of rear yoke 42, and a spacer 411 is provided to allow those particular rivets 410 to slide in slots 402 of arms 401, achieving the slidable connections referred to above.

Each cable guide 405 slidingly receives a cable 412 preferably attached to a cable tensioning mechanism 413 which preferably is mounted in opening 414 of tongue 415, which depends from lower arm 416 of rear yoke 42. Tongue 415 is preferably made of polyurethane, and is preferably sandwiched together by rivets 419 with stiffener 417 (preferably made of ABS plastic of the type sold under the name KYDEX®) and pad 418 (preferably made of upholstered neoprene foam or the like) which is primarily for the comfort of the user.

Figure 5:
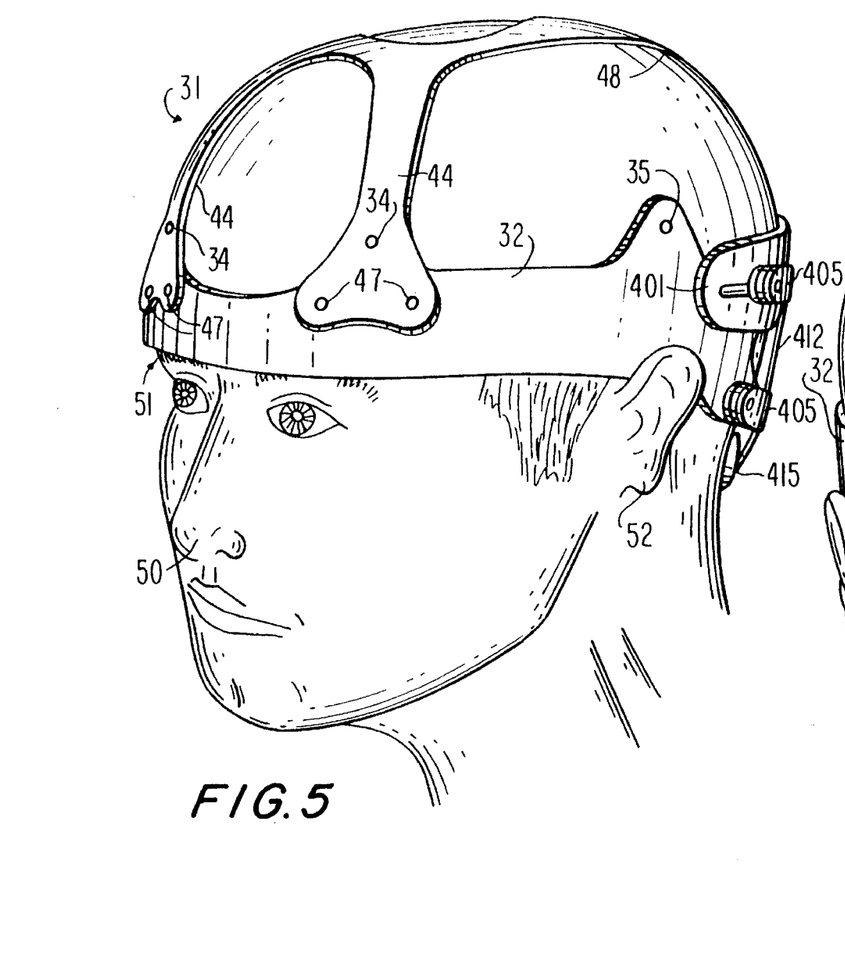
FIGS. 5 and 6 are front and rear perspective views, respectively, of the liner of FIGS. 3 and 4 mounted on the head of a user.
Figure 6:
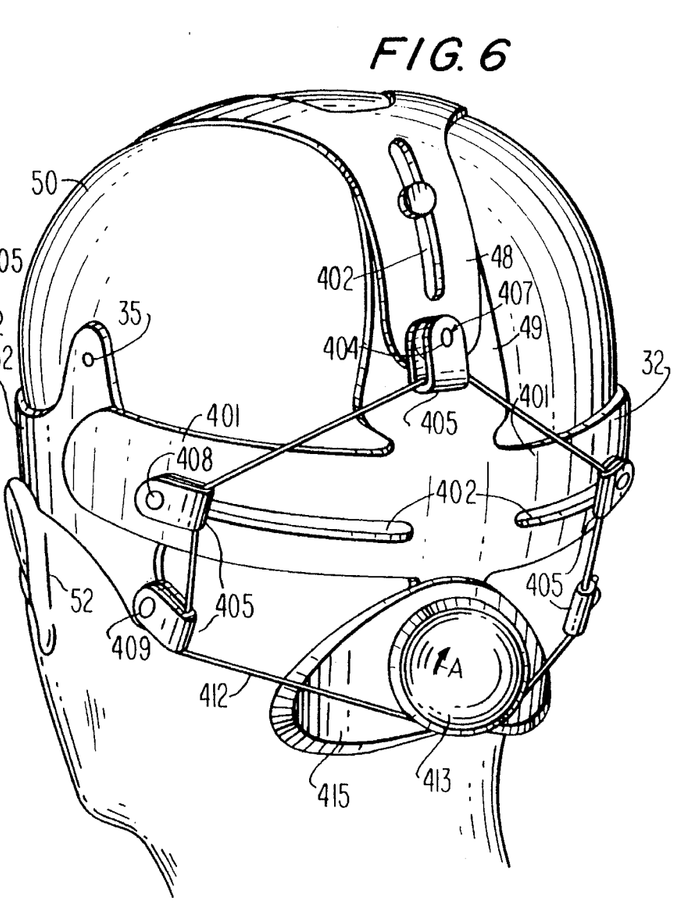

As best seen in FIGS. 5 and 6, liner 31 is placed on user's head 50 and aligns to the user's brow ridge at 51 and to the user's ears 52, and is tightened about head 50 by turning tensioning mechanism 413 in the direction indicated by arrow A. Mechanism 413 may preferably be a tensioning mechanism such as that described in U.S. Pat. No. 5,042,177, but any suitable mechanism can be used. In the preferred mechanism 413, turning in the direction of arrow A shortens the length of cable 412 using a ratchet-type mechanism which cannot be loosened (except as described below). The six-point arrangement of cable guides 405 and mechanism 413 itself causes the shortening of cable 412 to decrease the size of liner 31 in three different axes. As point 407 is brought closer to mechanism 413, liner 31 is made smaller in a circumference including the arc between those two points, with the effect of making the top of liner 31 smaller as arm 48 is brought downward and forward. Similarly, as point 408 are brought closer together, liner 31 is made smaller in a circumference including the arc between those two points, with the effect of shortening band 32 and uniformly tightening band 32 about head 50. Finally, as points 409 are brought together, tongue 415 is brought forward to engage the indentation at the occipital area of head 50, which not only further secures liner 31 to head 50 but also serves to align it with head 50. Because a single cable 412 under control of a single mechanism 413 controls these three motions, they occur simultaneously and uniformly, fastening liner 32 uniformly and securely to head 50.

Mechanism 413 is preferably a ratchet-type mechanism as discussed above. Preferably, mechanism 413 can be released by pressing on its center, allowing tongue 415 to be pulled back, lengthening cable 412 and allowing liner 31 to be removed from head 50.

Figure 7:
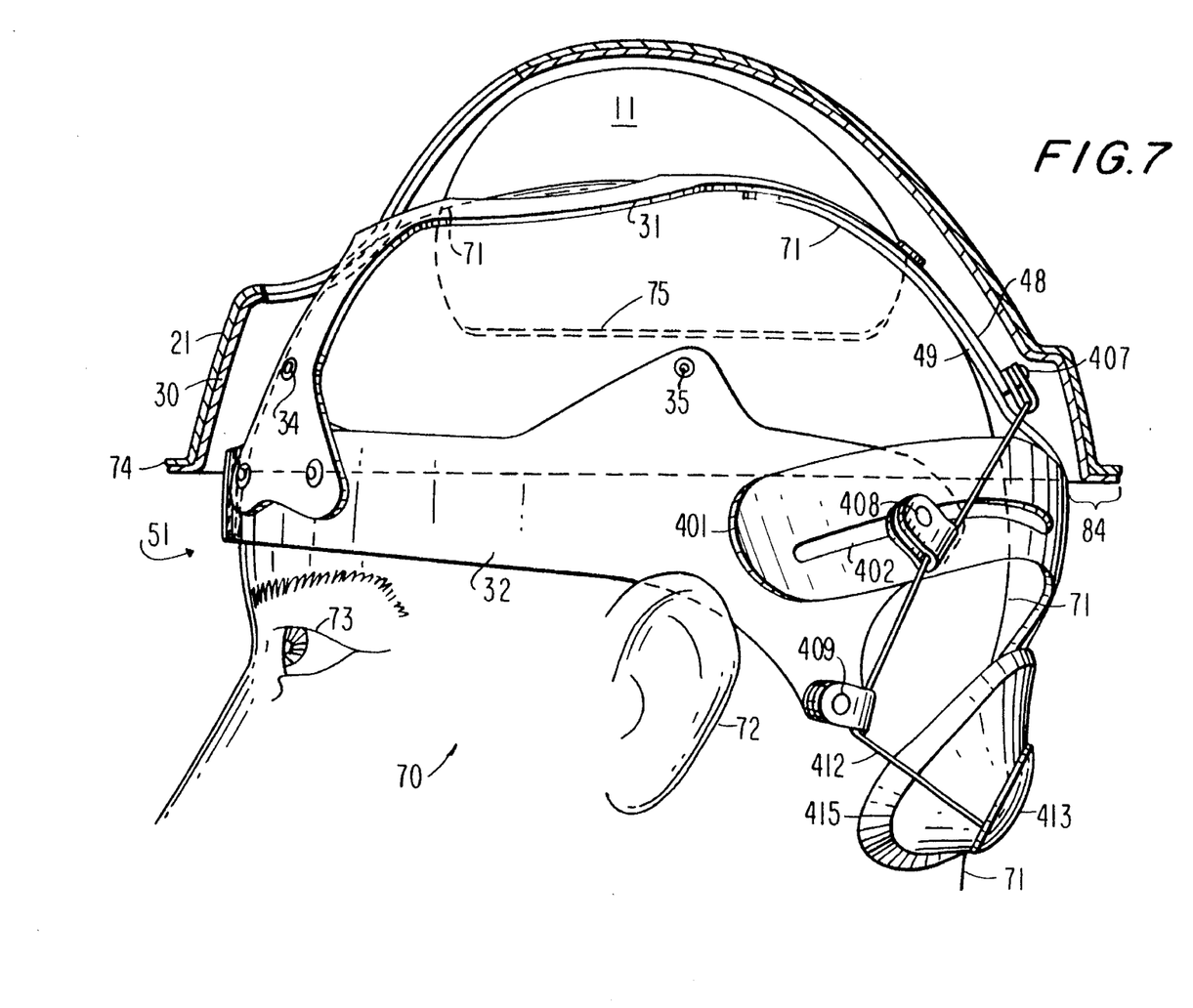
FIGS. 7 and 8 are side elevational views, partly in section, of the helmet mounting device of FIGS. 1–6 mounted on the heads of a larger user and a smaller user, respectively.
Figure 8:
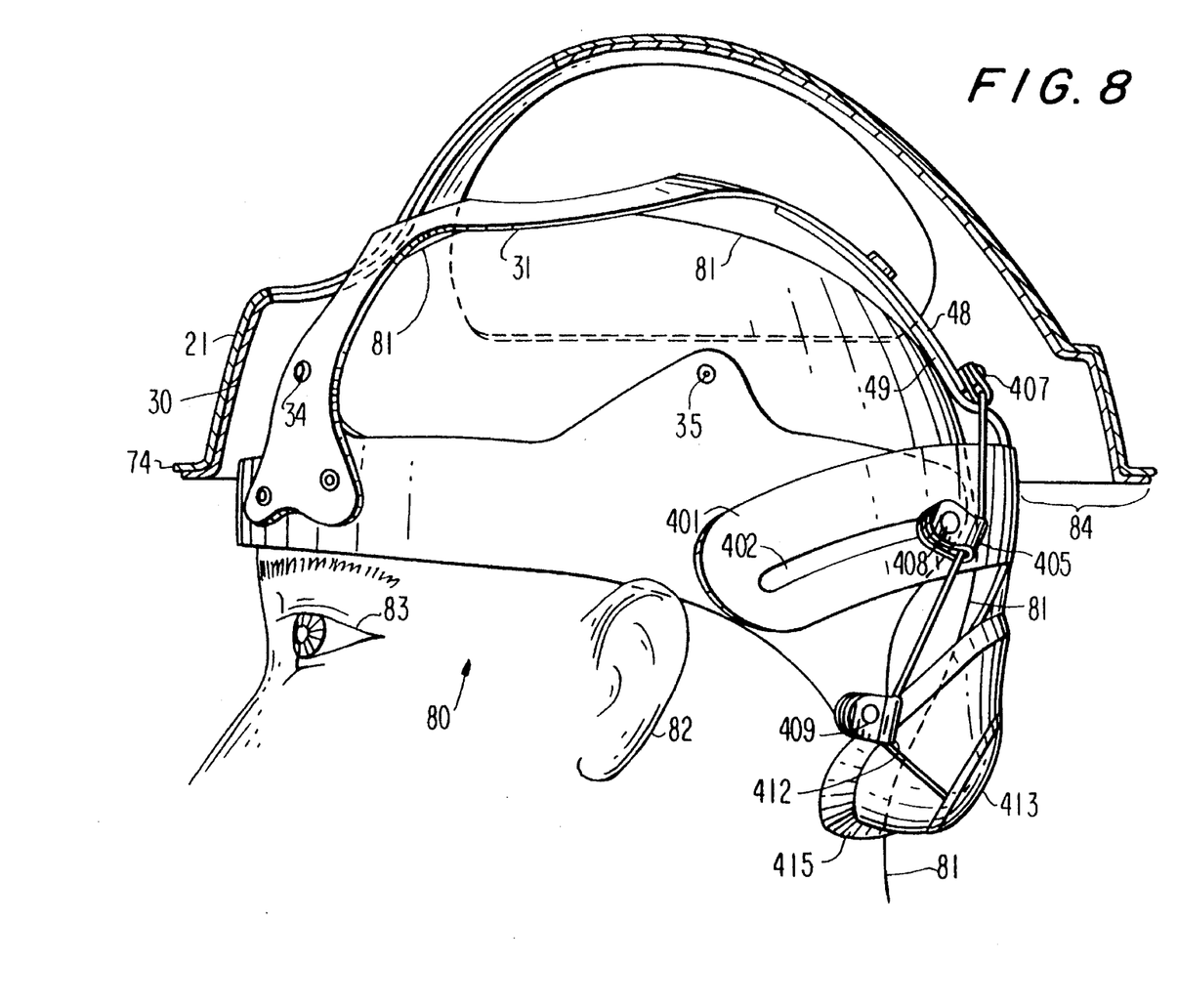

In use, of course, liner 31 will be attached to frame 30. FIGS. 7 and 8 show the combined helmet mounting device 20 mounted, along with shell 21, on heads 70, 80 of different sizes. On larger head 70, having skull contour 71, retention band 32 lines up with ears 72 and brow ridge 51, so that front edge 74 is aligned in proper relation with eyes 73 so that the user will be looking at the "sweet spot" of the optics mounted in extension 102 of helmet body 101. On smaller head 80, having skull contour 81, band 32 lines up with ears 82 and brow ridge 51 so that front edge 74 is aligned in proper relation with eyes 83 so that the user again will be looking at the "sweet spot" of the optics mounted in extension 102 of helmet body 101. Careful comparison of FIGS. 7 and 8 reveals that eyes 73 and eyes 83 are slightly different relative positions to front edge 74, but the optics are preferably designed with sufficient tolerance to accommodate such small differences. What is important is that all of the adjustment that occurs between FIGS. 7 and 8 occurs at the back of helmet mounting device 20, increasing or decreasing overhang distance 84, while keeping the relationship of the front of helmet mounting device 20 (and ultimately any optics mounted thereon) to head 50 substantially constant.

The preferred shapes of frame 30 and shell 21 as depicted in FIGS. 1–10 are selected to maximize strength and minimize weight. The large fenestrations or openings 11, 12, 13, 14 are provided to reduce weight to increase user comfort, and to provide a clean, hygienic appearance. As a result, the strength of the materials used in frame 30 and shell 21 must be great, because struts 15, 16, 17, 18 must be stiff. If struts 15, 16, 17, 18 are not sufficiently stiff, helmet base 10 may flex, and helmet 101 may not be properly aligned. A particularly preferred material for frame 30 and shell 21 is a carbon fiber composite material, and especially a high-temperature carbon-fiber composite material, such as Carbon Prepreg LTM-22, available from Advanced Composites Group, Inc., of Owasso, Okla.

Figure 9:
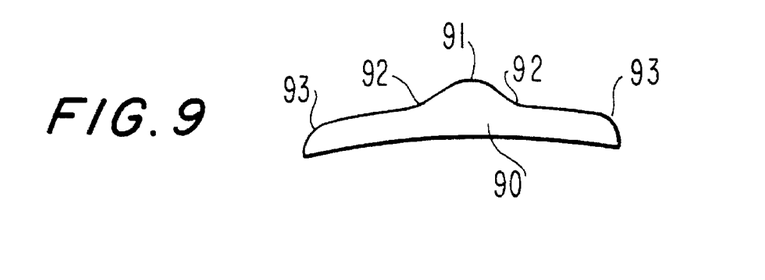
FIG. 9 is a cross-sectional view, taken from line 9—9 of FIG. 1, of a strut of the frame.
Figure 10:
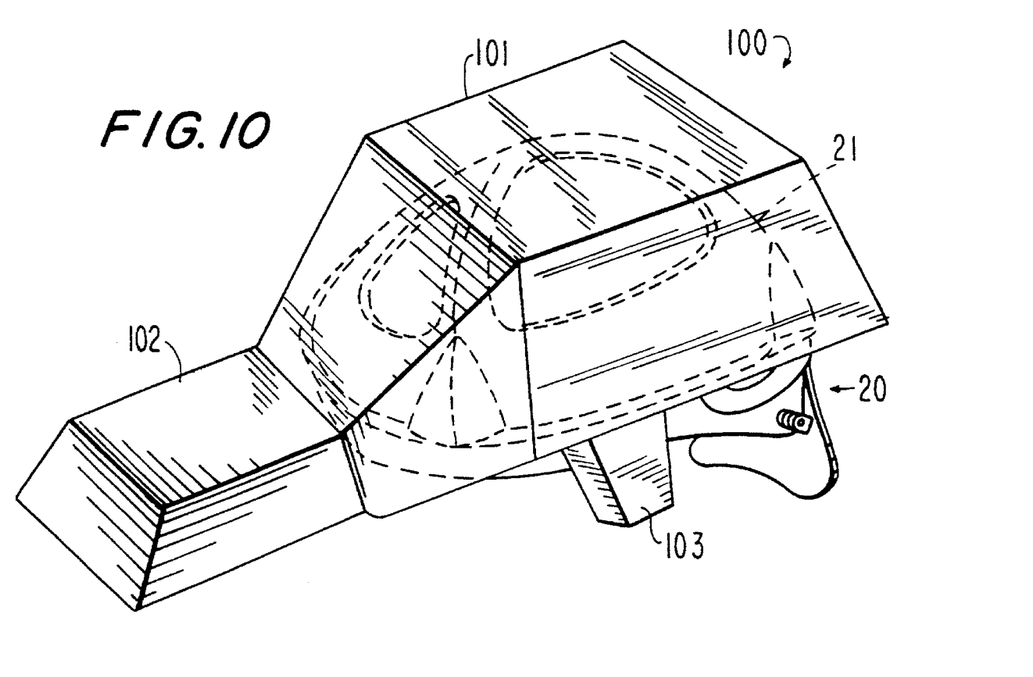
FIG. 10 is a schematic perspective view of a head-mounted display helmet according to the present invention.

The shapes of frame 30 and shell 21 are also dictated in part by considerations of strength. Thus, a particularly preferred cross section 90 for struts 15, 16, 17, 18 of frame 30 is shown in FIG. 9. Of particular significance is the outer portion of cross section 90, which has a central ridge 91 of a first concavity, two medial areas 92 of a second concavity opposite to the first concavity, and tapered edges 93 opposite to the second concavity and the same as, or in the same direction as, the first concavity. This combination of alternating concavities contributes to the strength of struts 15, 16, 17, 18 of frame 30. The struts of shell 21 have a complementary arrangement of concavities on their inner contour, which must mate with the outer contour shown in FIG. 9.

The shapes of fenestrations 11, 12, 13, 14 are also dictated in part by concerns of strength. A stress analysis would reveal that if any fenestration had a sharp corner, the lines of stress around that corner would follow smooth curves. Thus, material immediately adjacent the sharp corner would be adding weight but bearing no load. Therefore, each of fenestrations 11, 12, 13, 14 is preferably bounded by smooth curves, made up of segments all of which are preferably circular or elliptical arcs. For example, although bottom contour 75 of fenestration 11 appears in elevation (FIG. 7) as a straight line segment, it is in fact elliptical as seen from above (not shown). By eliminating the sharp corners, all material that is providing weight without bearing load is eliminated, minimizing the weight of helmet mounting device 20 or helmet base 10 without affecting its strength.

The shapes of frame 30 and shell 21 are also dictated in part by concerns for alignment. At a minimum, the outer surface of frame 30 should be able to nest within the inner surface of shell 21. But more than that, it is preferable that the shapes of those surfaces contribute to the quick and easy alignment of frame 30 and shell 21, so that users who have previously donned helmet mounting device 20 while waiting their turn to experience the virtual reality attraction can quickly and easily mount helmet 101 and align it correctly. Thus, each of frame 30 and shell 21 has a spherically asymmetric shape, so that they fit together only one way. For example, each has tetrahedral corners 22, partly for rigidity at the corners and partly to help guide the interengagement of the two halves. However, the tetrahedra 22 near the back corners are substantially along the back surface, while those near the front corners are more along the sides. While that is done primarily to leave room for the optics of the head-mounted display, it also assures that frame 30 and shell 21 cannot be put together backwards.

In addition, ridges 91 not only add strength, but preferably are used to guide shell 21 onto frame 30 where they mesh with corresponding grooves on the inner surface (not shown). Struts 15, 16, 17, 18, and their ridges 91, of frame 30 preferably are continuously convex outward (and the grooves of shell 21 are continuously concave), so that once shell 21 is placed on frame 30 within 90° of the correct orientation, it preferably is guided almost automatically into place, with no opportunity to be "hung up" on frame 30. At 90°, the fact that frame 30 is longer than shell 21 is wide becomes an insurmountable obstacle, as flange 36 of shell 21 locks into fenestrations 12, 13. As the angle exceeds 90°, shell 21 will try to align itself to the 180° position, but the asymmetry referred to above will prevent that.

It will be apparent with respect to the shape of shell 21 and its alignment with frame 30 that the same principles hold if helmet 100 has a built-in cavity for receiving frame 30.

Figure 11:
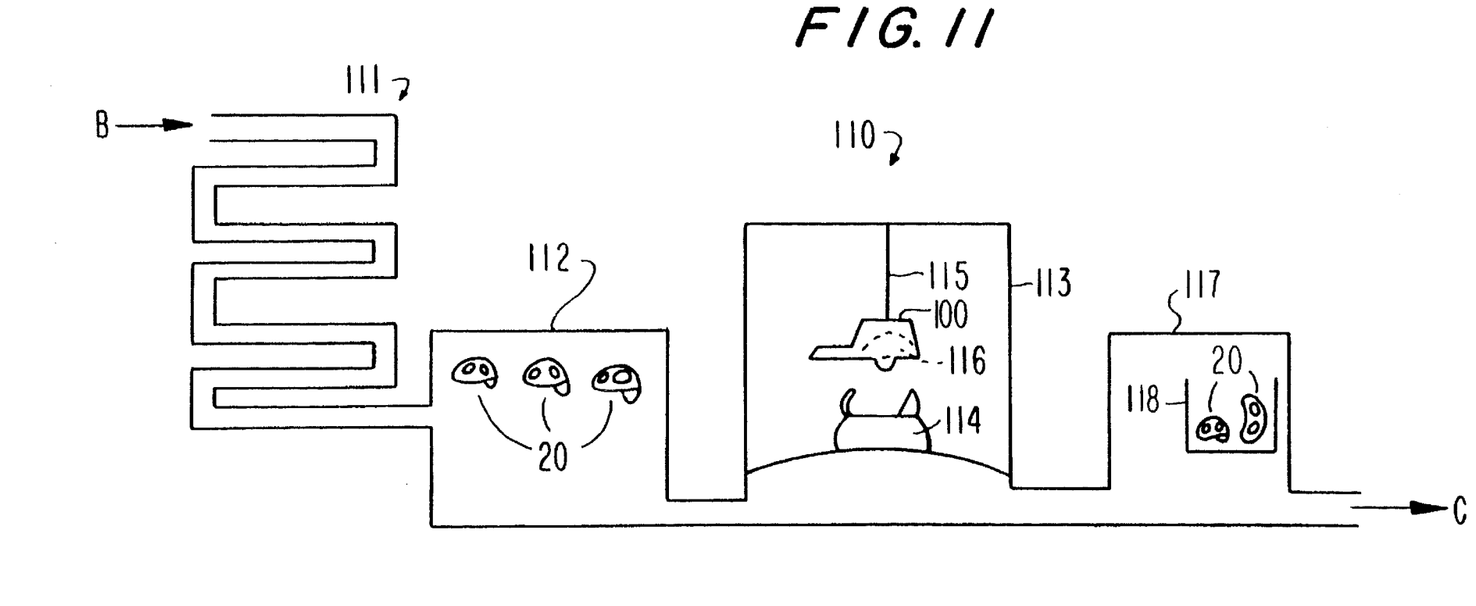
FIG. 11 is a schematic representation of a virtual reality amusement attraction using helmet system according to the present invention.

A schematic diagram of a virtual reality amusement attraction 110 incorporating a helmet system according to the present invention is shown in FIG. 11. Users enter attraction 110 through queue 111 in the direction of arrow B, eventually reaching anteroom 112, which is filled with a supply of helmet mounting devices 20, shown schematically. While they are waiting in queue 11, the users preferably are shown a video presentation about the experience they are about to have, preferably including instructions on the donning of devices 20. By the time each user reaches simulator chamber 113, he or she is expected to have donned device 20, although an attendant could be provided to make certain device 20 is on correctly.

Chamber 113 preferably contains a motion base 114 (a particularly preferred motion base is described in copending, commonly-assigned U.S. patent application Ser. No. 08/267, 787, filed concurrently herewith and hereby incorporated by reference in its entirety) on which the user sits, and a helmet 100 preferably suspended as at 115, having a cavity 116 either built right in or provided by shell 21 around which helmet 100 may be built. The user preferably aligns helmet 100 with frame 30 as he or she has previously been instructed (again an attendant may be provided), and is ready to enjoy the virtual reality experience. After the experience, the user removes helmet 100, leaving it suspended in chamber 113, and preferably passes to exit chamber 117, where he or she removes helmet mounting device 20 and preferably deposits it in bin 118 for cleaning and re-use, and then exits in the direction of arrow C. The high strength of frames 30, as discussed above, minimizes concerns regarding breakage of helmet mounting devices 20 a they are handled by users in chambers 112 and 117, and as they are tossed into bin 118.

Thus it is seen that a way to mount a helmet, particularly one with a head-mounted display, quickly and securely on the head of a user, as well as a head-mounted display helmet whose optical path can be quickly and easily aligned with the eyes of a user, and a system in which each user could be assured of a clean helmet, and in which the helmets would be resistant to breakage from excessive handling such as might occur in a theme park setting, have been provided. One skilled in the art will appreciate that the present invention can be practiced by other than the described embodiments, which are presented for purposes of illustration and not of limitation, and the present invention is limited only by the claims which follow.

What is claimed is:

1. A helmet mounting device for mounting a helmet on a head of a user, said helmet mounting device comprising:

a substantially stiff frame for resting on said head for accepting said helmet thereon without positive attachment of said helmet to said frame;

a retention band depending from said frame for encircling said head to retain said frame on said head; and a tightening mechanism for tightening said retention band to any one of a large number of substantially continuously spaced sizes after said retention band has been placed on said head; wherein:

said tightening mechanism includes a tensioning device for constricting said retention band uniformly about said head;

said tightening mechanism and said retention band include alignment portions for aligning said device in a predetermined orientation relative to said head; said helmet mounting device further comprising:

an alignment structure for aligning said helmet with said device, thereby aligning said helmet with said head, said alignment structure comprising at least three ridges extending upward from respective locations at lower outer extremities of said device, said helmet having grooves corresponding to said ridges, wherein:

each of said ridges has a cross section, said cross section having a peak, a respective sloping section on either side of said peak, and a respective tapered edge beyond each respective sloping section, said peak has a first concavity, each said respective sloping section has a second concavity in a direction opposite said first concavity, and each said respective tapered edge has a third concavity in a same direction as said first concavity.

2. The helmet mounting device of claim 1 wherein said alignment portions align said device by interengaging with cranial features of said head.

3. The helmet mounting device of claim 2 wherein said tightening mechanism has a dependent portion attached to said retention band for interengaging with the occipital area of said head.

4. The helmet mounting device of claim 1 comprising four of said ridges.

5. The helmet mounting device of claim 4 wherein said respective locations form four corners of a trapezoid.

6. The helmet mounting device of claim 1 wherein said ridges substantially meet at a point remote from said respective locations.

7. The helmet mounting device of claim 6 wherein each of said ridges curves upward and inward as it extends from said respective location to said point without changing concavity.

8. A head-mounted display comprising:

a headset having:

audiovisual projection equipment for presenting a sensory experience to a user, and a cavity having a spherically asymmetrical shape; and a headset mounting device having:

a substantially stiff frame for resting on said head for accepting said headset thereon, said frame having a spherically asymmetrical shape complementary to said shape of said cavity, a retention band depending from said frame, and a tightening mechanism for tightening said retention band to a large number of substantially continuously spaced sizes after said retention band has been placed on said head, said headset mounting device being for securing to said head and for receiving said headset placed over said frame with said frame protruding into said cavity without positive attachment of said headset to said frame, said complementary spherically asymmetrical shapes of said cavity and said frame causing said headset to assume a predetermined alignment relative to said frame.

9. The head-mounted display of claim 8 wherein said tightening mechanism includes a tensioning device for constricting said retention band uniformly about said head.

10. The head-mounted display of claim 9 wherein said tightening mechanism and said retention band include alignment portions for aligning said device in a predetermined orientation relative to said head.

11. The head-mounted display of claim 10 wherein said alignment portions align said device by interengaging with cranial features of said head.

12. The head-mounted display of claim 11 wherein said tightening mechanism has a dependent portion attached to said retention band for interengaging with the occipital area of said head.

13. The head-mounted display of claim 8 wherein said cavity comprises at least three grooves extending upward from respective locations at lower outer extremities of said cavity, said device having ridges, corresponding to said grooves, extending from respective corresponding locations on said frame.

14. The head-mounted display of claim 13 wherein said device comprises four of said ridges.

15. The head-mounted display of claim 14 wherein said respective locations form four corners of a trapezoid.

16. The head-mounted display of claim 13 wherein said ridges substantially meet at a point remote from said respective locations.

17. The head-mounted display of claim 16 wherein each of said ridges curves upward and inward, without changing concavity, as it extends from said respective location to said point.

18. The head-mounted display of claim 13 wherein each of said ridges has a cross section, said cross section having a peak, a respective sloping section on either side of said peak, and a respective tapered edge beyond each respective sloping section: wherein:

said peak has a first concavity;

each said respective sloping section has a second concavity opposite said first concavity; and each said respective tapered edge has a third concavity corresponding to said first concavity.

19. A virtual reality helmet system for presenting a virtual reality experience seriatim to a plurality of users, said system comprising:

at least one headset having:

audiovisual projection equipment for presenting a virtual reality experience to a user, and a cavity having a spherically asymmetrical shape; and a plurality of headset mounting devices each having:

a substantially stiff frame for resting on said head for accepting said headset thereon, said frame having a spherically asymmetrical shape complementary to said shape of said cavity, a retention band depending from said frame for encircling said head to retain said frame on said head, and a tightening mechanism for tightening said retention band to any one of a large number of substantially continuously spaced sizes after said retention band has been placed on said head, each of said devices being for securing to a head of a different user, and said headset placed over each respective one of said devices seriatim, as each user begins said virtual reality experience, said frame of each of said devices protruding into said cavity, said complementary spherically asymmetrical shapes of said cavity and said frame causing said headset to assume a predetermined alignment relative to each respective one of said frames, without positive attachment of said headset to said respective one of said frames.

20. The virtual reality helmet system of claim 19 wherein said tightening mechanism includes a tensioning device for constricting said retention band uniformly about said head.

21. The virtual reality helmet system of claim 20 wherein said tightening mechanism and said retention band include alignment portions for aligning said device in a predetermined orientation relative to said head.

22. The virtual reality helmet system of claim 21 wherein said alignment portions align said device by interengaging with cranial features of said head.

23. The virtual reality helmet system of claim 19 wherein said tightening mechanism has a dependent portion attached to said retention band for interengaging with the occipital area of said head.

24. The virtual reality helmet system of claim 19 wherein said cavity comprises at least three grooves extending upward from respective locations at lower outer extremities of said cavity, said device having ridges, corresponding to said grooves, extending from respective corresponding locations on said frame.

25. The virtual reality helmet system of claim 24 wherein said device comprises four of said ridges.

26. The virtual reality helmet system of claim 25 wherein said respective locations form four corners of a trapezoid.

27. The virtual reality helmet system of claim 24 wherein said ridges substantially meet at a point remote from said respective locations.

28. The virtual reality helmet system of claim 27 wherein each of said ridges curves upward and inward, without changing concavity, as it extends from said respective location to said point.

29. The virtual reality helmet system of claim 24 wherein each of said ridges has a cross section, said cross section having a peak, a respective sloping section on either side of said peak, and a respective tapered edge beyond each respective sloping section: wherein:

said peak has a first concavity;

each said respective sloping section has a second concavity opposite said first concavity; and each said respective tapered edge has a third concavity corresponding to said first concavity.

\* \* \* \* \*